July 14, 1953  M. L. JOHNSON  2,645,503
TRACTOR WHEEL GUARD
Filed Oct. 17, 1951
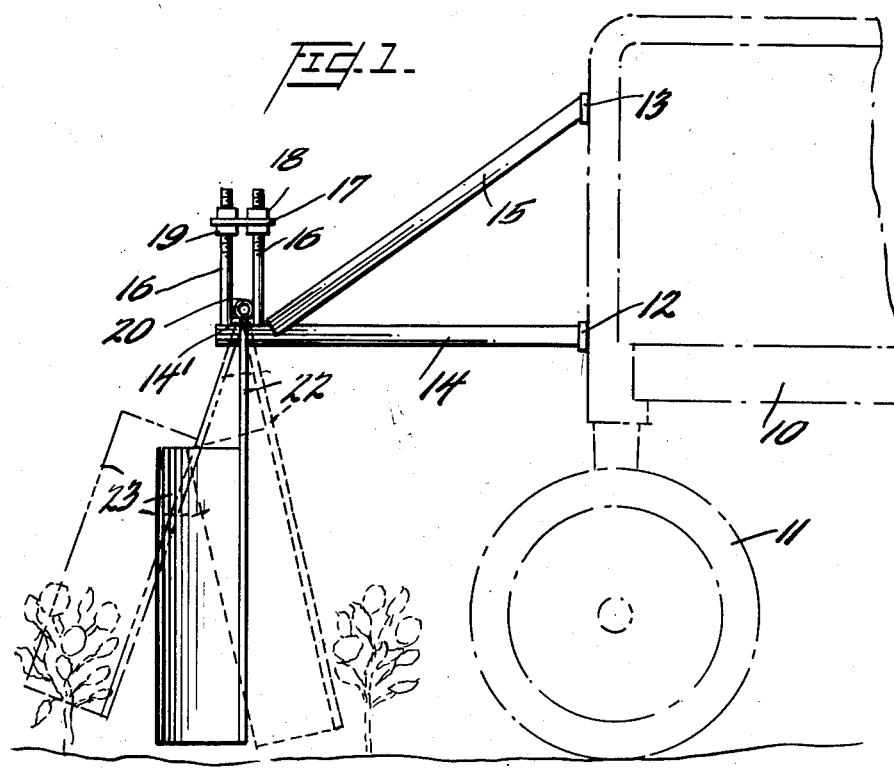
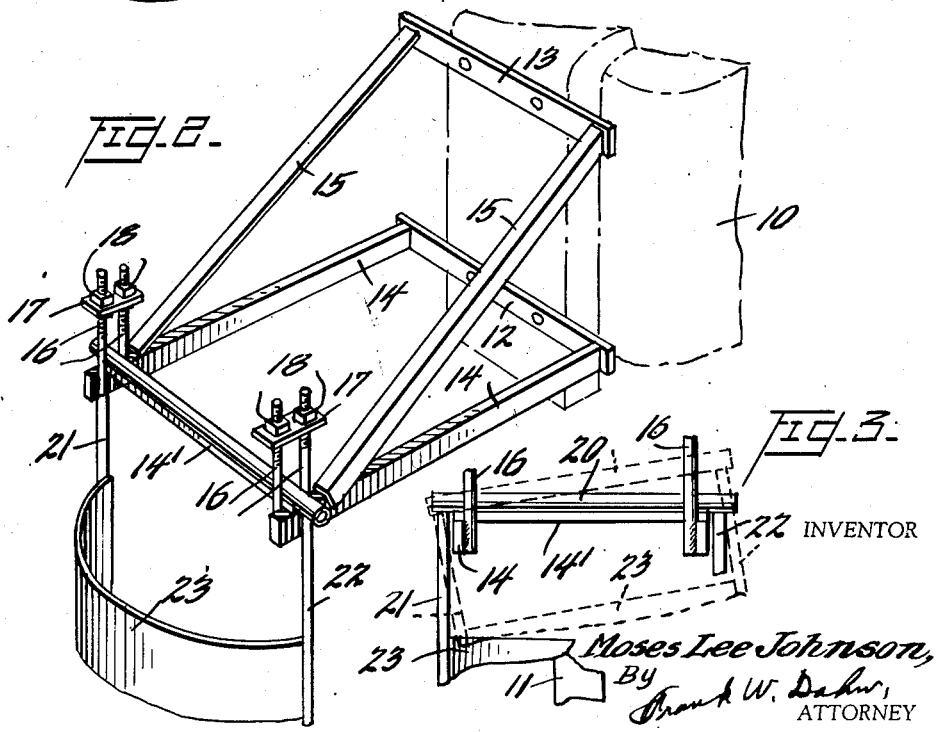
INVENTOR
Moses Lee Johnson,
By Frank W. Dahn,
ATTORNEY Patented July 14, 1953

2,645,503

UNITED STATES PATENT OFFICE 2,645,503

TRACTOR WHEEL GUARD

Moses Lee Johnson, Sumter, S. C., assignor of forty-nine per cent to Morris David Mazursky, Sumter, S. C.

Application October 17, 1951, Serial No. 251,704

6 Claims. (Cl. 280—160)

My invention relates to a tractor wheel guard and it is an object of the same to provide means for protecting plants from damage by tractor wheels. The device is intended particularly for use in connection with the cultivation of growing plants, but obviously will be of service at any time when a tractor is moved along rows of growing plants such as cotton, and also whenever a tractor is moved among plants, whether mature or immature, if the plants or their leaves are readily movable out of normal position so that they will not be damaged by the wheels of the tractor or by other parts moving with the tractor.

A more particular object of the invention is to provide a guard that can move in any direction while acting yieldingly on a plant to move the plant, or parts thereof, out of the path of machine parts that might cause injury to the same.

Another object is to provide a guard that can move aside upon encountering any fixed object, such as a stump or a stone that would otherwise damage the guard.

Another object is to provide a guard that will act with equal effectiveness at any ordinary speed at which a tractor will be driven in the cultivation treatment of plants, maximum efficiency of the guard being had at speeds from five to eight miles per hour.

Referring now to the annexed drawings, which are made a part of this application and in which similar reference characters indicate similar parts:

Fig. 1 is a side elevation of a portion of a tractor equipped with the tractor guard of my invention, Fig. 2, a perspective with parts broken away, and Fig. 3, a detail of parts shown in Figs. 1 and 2.

In the drawings, reference character 10 indicates generally the framework of a tractor having wheels 11 of any suitable or conventional character. A suitable support is provided on the frame for carrying a guard, and this support is here shown as including crossbars 12, 13 secured to the body of the tractor, side bars 14, 14 extending lengthwise of the tractor and rigidly secured to the bar 12, a crossbar 14' connecting the side bars 14, 14, and inclined braces 15, 15 fixed at one end to the bar 13 and at the other to the adjacent side bar 14. The parts so far mentioned are rigidly connected to each other and to the tractor, and obviously may be changed in form and design in many ways, so long as they support in proper manner the guard now to be described.

Upon the side bars there are mounted guides here shown as comprising a pair of upright rods or fingers 16, 16 on each side bar 14. The bars 15, 16 of each pair are connected by a flat metallic connector 17, held in place by upper and lower nuts 18, 19.

A rod 20, here shown as being hollow for lightness and strength, rests upon the side bars 14, 14 and forms the upper member of the guard, which also includes vertical rods 21, 22 depending from the rod 20, and a rearwardly bowed part 23 in the shape of a segment of a cylinder of sheet metal which extends from a point near the level of side bars downward more or less nearly to the ground, the length and the position of its upper and lower margins depending upon the conditions of expected use of the device.

In the use of my device it is mounted in front of a wheel of a tractor or other vehicle, upon a frame or bracket which may be as shown in the drawings or may have any other suitable shape that permits the guard to move out of the way of obstacles and to press aside plants that might otherwise be damaged by the wheel or other parts moving with the vehicle. As will be evident upon consideration of the drawings, the guard can swing backward as shown in Fig. 1 in dotted lines upon encountering an obstacle and will naturally exert a gentle push against plants or other yieldable objects, and the same is true in case the vehicle is being moved backward as also shown in dotted lines in Fig. 1, except of course that the guard swings forward in such case. If a plant in a row, for example, is out of line so that a wheel might run over it, the guard can be swung to one side by such a plant, but it also pushes the plant toward the line of the row, and so may often save the same from being run over or from having its leaves or other parts damaged. It will be evident that the mounting of the guard is such that it can swing with equal facility to either side of a plant or row of plants as shown in dotted lines in Fig. 1, and in either case it will urge the plants contacted by it toward a position out of the path of the wheel guarded thereby.

It will be evident that a similar guard can be applied to each of a plurality of tractor wheels that are in need of being guarded. In the case of the triangular tractors having large rear drive wheels and twin front wheels close together, the twin wheels can be guarded by means quite similar to the guard shown in the drawings but somewhat wider. Similarly it will be seen that the supporting frames or brackets can be varied according to circumstances and, in general, it will be evident that many changes may be made in the devices disclosed in this application, all without departing from the spirit of the invention; and therefore I do not limit myself to what is shown in the drawings and described in the specification, but only as indicated in the appended claims.

Having thus fully described my invention, what I claim is:

1. A wheel guard comprising a fixture extending from an end of a vehicle, said fixture having laterally spaced side bars, a pair of upwardly extending fingers on each side bar, a rod supported at each end on a side bar between the pair of fingers on said bar, said fingers being spaced so as to permit the rod to move bodily upward and downward or to tilt transversely of the vehicle or to rock on its supports, and a plant guard extending downward from the rod.

2. A device as in claim 1, wherein the guard extends substantially from side to side of a vehicle wheel and is bowed away from the periphery of the wheel between the side edges of the guard.

3. A device as in claim 1, wherein the rods extend upward and are connected by a crossbar at a height permitting the guard to tilt to a substantial extent.

4. A device as in claim 1, including inclined braces each connected at one end to an elevated part of the vehicle and at the other end to one of the side bars.

5. A device as in claim 1, wherein the guard is bent back at one side edge so as to force plants away from the path of the wheel.

6. A device as in claim 1, wherein the guard is bent back at each side so as to fend plants away from the path of the wheel.

MOSES LEE JOHNSON.

References Cited in the file of this patent

UNITED STATES PATENTS

| Number | Name | Date |
|---|---|---|
| 1,469,801 | McKenney | Oct. 9, 1923 |
| 1,764,572 | McNees | June 17, 1930 |
| 1,811,054 | Kipp et al. | June 23, 1931 |
| 1,818,468 | Fickenscher | Aug. 11, 1931 |
| 2,064,480 | Lock et al. | Dec. 15, 1936 |
| 2,414,676 | Taurman et al. | Jan. 21, 1947 |

FOREIGN PATENTS

| Number | Country | Date |
|---|---|---|
| 162,107 | Great Britain | Apr. 28, 1921 |